(12) United States Patent
Soltau et al.

(10) Patent No.: US 9,159,518 B2
(45) Date of Patent: Oct. 13, 2015

(54) RADIATION ENTRY WINDOW FOR A RADIATION DETECTOR

(75) Inventors: Heike Soltau, Munich (DE); Bianca Schweinfest, Augsburg (DE); Gerhard Lutz, Munich (DE); Ladislav Andricek, Poecking (DE); Lothar Strueder, Munich (DE)

(73) Assignees: PNSensor GMBH, Munich (DE); Max-Planck-Gesellschaft Zur Foerderung Der Wissenschaften E.V., Munich (DE)

( * ) Notice: Subject to any disclaimer, the term of this patent is extended or adjusted under 35 U.S.C. 154(b) by 138 days.

(21) Appl. No.: 13/825,342

(22) PCT Filed: Aug. 26, 2011

(86) PCT No.: PCT/EP2011/004289
§ 371 (c)(1),
(2), (4) Date: Sep. 26, 2013

(87) PCT Pub. No.: WO2012/038017
PCT Pub. Date: Mar. 29, 2012

(65) Prior Publication Data
US 2014/0008538 A1    Jan. 9, 2014

(30) Foreign Application Priority Data
Sep. 21, 2010    (DE) .......................... 10 2010 046 100

(51) Int. Cl.
*H01J 5/18*    (2006.01)
*G01T 1/29*    (2006.01)

(52) U.S. Cl.
CPC *H01J 5/18* (2013.01); *G01T 1/2928* (2013.01)

(58) Field of Classification Search
CPC .......................................................... H01J 5/18
See application file for complete search history.

(56) References Cited

U.S. PATENT DOCUMENTS

| 4,939,763 | A | * | 7/1990 | Pinneo et al. ................. 378/161 |
| 5,039,203 | A | | 8/1991 | Nishikawa |
| 5,173,612 | A | | 12/1992 | Imai et al. |
| 6,002,202 | A | * | 12/1999 | Meyer et al. ................. 313/420 |
| 6,803,570 | B1 | | 10/2004 | Bryson, III et al. |
| 2007/0085016 | A1 | | 4/2007 | Schulz |
| 2009/0019129 | A1 | | 1/2009 | Suzuki |

FOREIGN PATENT DOCUMENTS

| DE | 20321061 U1 | 12/2005 |
| DE | 102005046164 A1 | 3/2007 |

(Continued)

OTHER PUBLICATIONS

International Search Report for PCT/EP2011/004289 dated Nov. 24, 2011.

*Primary Examiner* — Constantine Hannaher
(74) *Attorney, Agent, or Firm* — Caesar Rivise, PC

(57) ABSTRACT

The invention concerns a radiation entry window (10) for a radiation detector (2), in particular for a semiconductor drift detector (2), with a flat window element (11), which is at least partially permeable for the radiation to be detected by the radiation detector (2), as well as with a window frame (12), which laterally frames the window element (11), wherein the window frame (12) consists of a semiconductor material and is considerably thicker than the window element (11). (FIG. 1)

25 Claims, 6 Drawing Sheets

(56) References Cited

FOREIGN PATENT DOCUMENTS

| | | | |
|---|---|---|---|
| JP | 2002365370 | A | 12/2002 |
| JP | 2006289145 | A | 10/2006 |
| JP | 200921700 | A | 1/2009 |
| WO | 9803353 | A1 | 1/1998 |

* cited by examiner

RADIATION ENTRY WINDOW FOR A RADIATION DETECTOR

BACKGROUND OF THE INVENTION

The invention concerns a radiation entry window for a radiation detector, in particular for a semiconductor detector, such as a semiconductor drift detector, a semiconductor pixel detector or a CCD detector (CCD: Charge-coupled device).

Detector modules are known from the art which are used for radiation measurement and can, for example, be used for X-ray spectroscopy or X-ray fluorescence analysis. Such conventional detector modules contain a semiconductor drift detector that is arranged hermetically sealed in a housing so that the detector module can also be operated in a protective gas atmosphere or under vacuum conditions. Here, the radiation to be detected enters the housing through a radiation entry window and then hits the semiconductor drift detector arranged within the housing. For the known detector modules of the type as described above, the radiation entry window is made of beryllium or a silicon lattice with a polymer film.

Such conventional radiation entry windows have various disadvantages, however. On the one hand, such conventional radiation entry windows are very elaborate in their production. They are individually manufactured manually piece by piece, and thus not open to the modern process methods of series production. On the other hand, there are occasional problems with such radiation entry windows with regard to gas tightness, which may lead to damages or a deterioration of the detector properties particularly when operating in bad environmental conditions (e.g. humidity).

From JP 09 021 700 AA a radiation window for an infrared sensor is known, with the radiation entry window showing a window frame made of a resin.

Reference is also made to DE 203 21 061 U1, DE 10 2005 046 164 A1 and JP 2002 36 5370 AA concerning the prior art.

Finally, the prior art also comprises JP 06.289.145 AA. This patent application discloses a radiation entry window for X-ray radiation with a window frame made of metal.

The object of the invention is therefore to create a correspondingly improved radiation entry window. Within the scope of the invention, it is particularly desirable that the radiation entry window may be manufactured as professionally as possible with modern process methods and is as thin and gas-tight as possible.

This object is achieved by means of a radiation entry window according to the invention.

DESCRIPTION OF THE INVENTION

The basic idea of the invention consists in the virtually monolithic combination of a thin window element and a thick window frame, wherein the window frame is manufactured from a semiconductor material (e.g. silicon) and is manufactured with the known planar technology in a semiconductor process.

The radiation entry window according to the invention therefore exhibits a flat, thin window element which is at least partly permeable for the radiation to be detected by the radiation detector. The radiation entry window according to the invention furthermore has a window frame framing the window element on the side, wherein the window frame is made of a semiconductor material and is much thicker than the thin window element.

With regard to the spatial arrangement of the window frame in relation to the thin window element, there are different options available within the scope of the invention which are described briefly in the following.

One of the variants of the invention provides that the window frame is essentially arranged on the inner side of the flat window element facing away from the radiation, so that the window frame supports the window element on the inside. This variant is particularly suitable for operation with an external overpressure or internal underpressure, since the thin window element is then pressed against the window frame from the outside.

Another variant of the invention instead provides that the window frame is essentially arranged on the outside of the flat window element facing towards the radiation, so that the window frame supports the thin window element from the outside. This variant of the invention is particularly suitable for operation with an external underpressure or internal overpressure, since the thin window element is then pressed from the inside against the window frame located outside.

However, the invention is not limited to the two variants described above with respect to the spatial arrangement of the window frame. It is, for example, also possible that the window frame surrounds the thin window element both on the inner side and on the outside.

It should furthermore be mentioned that the window frame has a cross-section profile that may have various shapes, as described briefly in the following.

In one variant of the invention, the window frame profile widens outwardly from the inner side facing away from the radiation. This variant of the invention is particularly suited for operation with external underpressure or internal overpressure.

In another variant of the invention, the window frame profile widens instead inwardly from the outside facing the radiation. This variant of the invention is particularly suited for operation with internal underpressure or external overpressure.

However, the invention is not limited to the two variants described above with respect to the window frame profile. The window frame may, for example, have a rectangular profile as well, or a differently shaped profile predetermined by the respective manufacturing process.

Also with regard to the construction of the flat window frame, there are different options available within the scope of the invention which are described briefly in the following.

In one variant of the invention, the flat window element consists of a single planar layer, wherein that is not, however, the preferred exemplary embodiment of the invention.

In one of the preferred exemplary embodiments of the invention, the thin window element instead consists of several planar layers lying one above the other which consist of different materials and may have different properties and functions. On the one hand, such a combination of several planar layers lying one above the other is advantageous to, for example, cover microscopic leaks in one planar layer with one or more other planar layers. On the other hand, the combination of several planar layers lying one above the other is also recommended, however, because of the required gas-tightness and to suppress optical light while simultaneously retaining permeability for the radiation to be detected (e.g. X-ray radiation).

With regard to the material of the at least one planar layer, there are several options which may be employed in any combination. The planar layers can, for example, consist of silicon dioxide ($SiO_2$), silicon nitride ($Si_3N_4$), Cyclotene™ (BCB: bis-benzocyclobutene), ormocer (Organically modified ceramics), polyimides (Kapton) or generally of organic or inorganic material, wherein semiconductor material is possible as well. In general, one can say that the layers are preferably either layers grown in an LPCVD process (LPCVD: Low pressure chemical vapor deposition) or a PECVD process (PECVD: Plasma-enhanced chemical vapor deposition), or layers that are vapor-deposited or sputtered, or polymers applied to a wafer as a resin (e.g. spun), which link due to light and/or heat and thus generate a kind of film that adheres very well to the surface of the wafer.

In addition, a DLC (Diamond Like Carbon) coating can be used. That is a sputtered carbon layer with mainly sp3 compounds. Such a DLC layer may be used individually or together with a nitride layer.

In case of a combination of several planar layers, the individual planar layers, however, preferably consist of different materials.

A simple window frame is sufficient for a radiation entry window with a small window opening, since the thin, flat window element then does not have to be mechanically supported due to the small size of the window opening.

In case of a larger window opening, it is advantageous, in contrast, if the flat window element is mechanically supported by at least one supporting web, wherein the supporting web subdivides the window element into several window openings.

In case of very large window openings, it is also possible that an appropriate number of supporting webs are arranged in a grid and subdivide the flat window element into a plurality of window openings, wherein the supporting webs are preferably arranged at a right angle.

Preferably, the supporting web here is monolithically connected with the window frame and quasi-monolithically with the window element, which is necessitated by a joint production in planar technology. It should furthermore be mentioned in this context that the supporting web preferably consists of the same semiconductor material as the window frame.

With regard to the spatial arrangement of the at least one supporting web concerning the flat window element, there are again several options which are briefly described in the following.

In one variant of the invention, the supporting web is on the inner side of the window element facing away from the radiation, which is particularly meaningful for operation at external overpressure or internal underpressure, since the flat window element is then pressed against the thin supporting web from the outside.

In another variant of the invention, the supporting web is instead arranged on the outside of the flat window element facing towards the radiation, which is particularly meaningful for operation at external underpressure or internal overpressure, since the flat window element is then pressed against the thin supporting web from the inside.

In any case, however, the supporting web is preferably on the same side of the thin window element as the window frame.

Also with regard to the cross-section shape of the supporting web there are different options available within the scope of the invention which are described briefly in the following. Due to the manufacturing process in the framework of planar technology, the supporting web usually exhibits a cross-section that widens towards the flat window element. It is, however, alternatively possible that the supporting web has a cross section, which is essentially rectangular. It should be mentioned, however, that the invention is not limited to the examples described above as regards the cross-section of the supporting web.

Furthermore it should be mentioned that the semiconductor material of the window frame and/or the supporting web is preferably silicon. The invention is, however, not limited to silicon in terms of the semiconductor material but can in principle also be realized with other semiconductor materials.

It should also be mentioned that the radiation entry window and particularly the thin, flat window element is preferably essentially gas-tight to allow operation in a protective gas atmosphere or under vacuum conditions.

The radiation entry window furthermore can have a filter function, in that the radiation entry window is essentially impermeable for optical radiation, in particular in a wavelength range which is visible for the humans, whereas the radiation entry window for the radiation to be detected (e.g. X-ray radiation) is essentially permeable.

The invention does not, however, only comprise the radiation entry window according to the invention as an individual component, but also extends to a complete detector module with a radiation detector sealed in a housing, wherein the radiation to be detected enters the housing through the radiation entry window and there hits the radiation detector.

Here, the objective is to achieve optimum performance of the entire detector module by reciprocal adjustment of the two planar processes in detector and window manufacturing, e.g. with respect to the layers applied to the radiation entry window of the module and the architecture of the radiation entry window of the detector. For example, light-tightness can be achieved either by aluminum layers applied to the module or to the detector, and those can be adjusted to each other.

In such a detector module, the radiation entry window is preferably connected with the housing of the detector module by a glued or welded connection, wherein the connection may include the window frame and/or the flat window element.

Here, the housing of the detector module for the radiation entry window exhibits an opening in the housing with a surrounding edge, wherein the radiation entry window according to the invention can be selected to lie on the outside or the inside of the edge of the housing opening.

For operation of the detector module under external overpressure or internal underpressure, it is advantageous if the radiation entry window lies on the outside of the housing opening edge with its window frame, since the radiation entry window is then pressed onto the housing opening due to the pressure conditions.

For operation of the detector module under internal overpressure or external underpressure, it is instead advantageous if the radiation entry window lies on the inside of the housing opening edge, since the radiation entry window is then pressed against the housing opening due to the pressure conditions.

Finally it should be mentioned that the invention also comprises a complete measuring device with such a detector module. It can, for example, be a measuring device that is an energy or wavelength dispersive spectrometer, which is in particular used for X-ray spectroscopy or X-ray fluorescence analysis, or a diffractometer to take diffraction pictures, or an X-ray colour camera, which takes temporally and spatially resolved radiographs.

BRIEF DESCRIPTION OF THE DRAWINGS

Other advantageous developments of the invention are explained in more detail below together with the description of the preferred exemplary embodiments of the invention on the basis of the figures. The figures show as follows:

FIGS. 1 and 2A show a detector module according to the invention 1 which may, for example, be used in an X-ray spectrometer for X-ray fluorescence spectroscopy, which is known per se from the prior art and therefore does not have to be described in detail.

Figure 1:
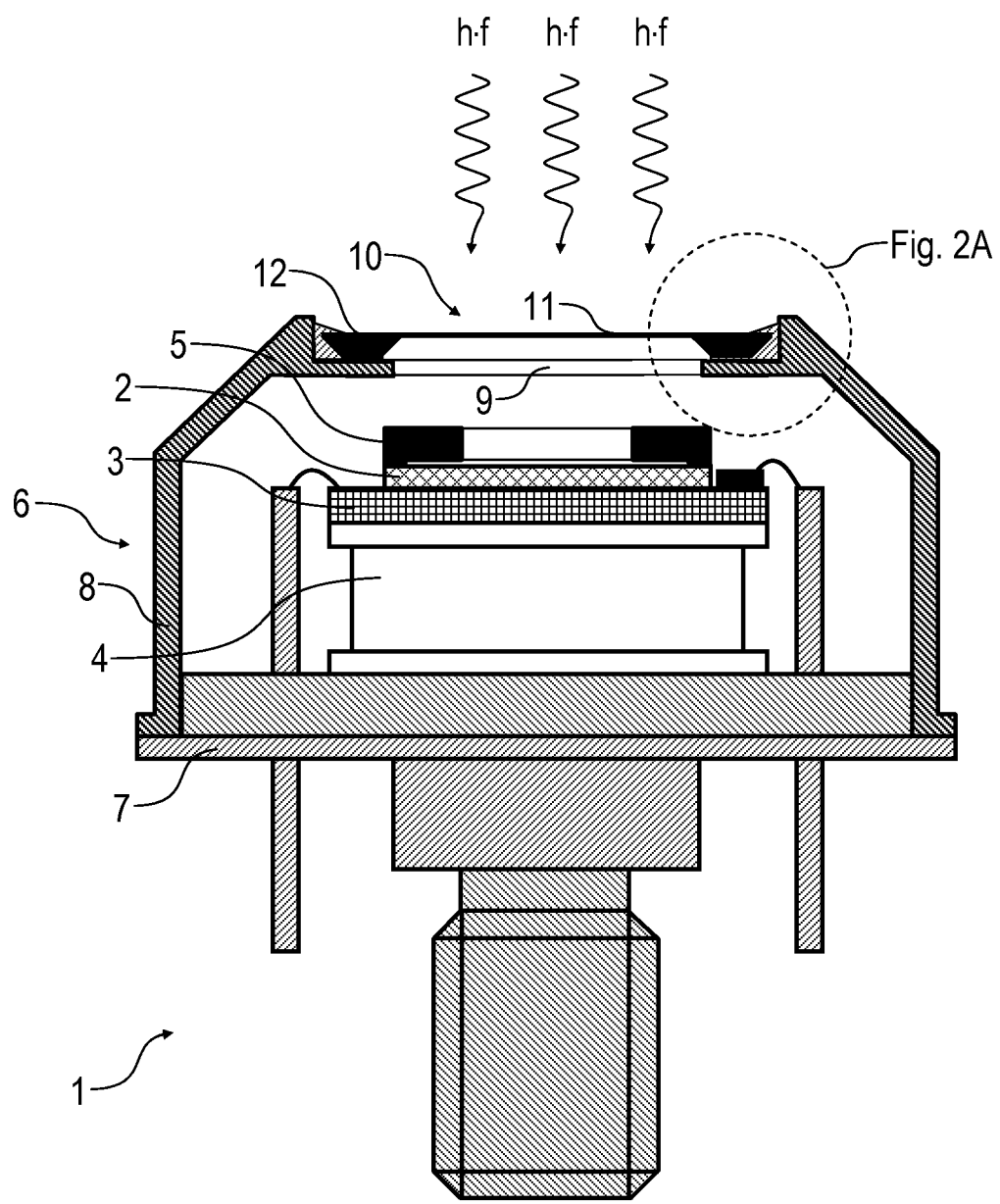
FIG. 1 a cross-sectional view of a detector module according to the invention with a novel radiation entry window according to the invention.

The detector module 1 has a semiconductor drift detector for radiation detection 2 which is arranged on a ceramic substrate 3, wherein the ceramic substrate 3 and thus also the semiconductor drift detector 2 may be cooled with a Peltier element 4 in order to achieve an operating temperature of the semiconductor drift detector during operation that is as constant as possible. On the upper surface of the semiconductor drift detector 2, there is a collimator 5 which generates a bundle of rays from the incident radiation shown here only schematically as wavy lines, which hits the semiconductor drift detector 3.

The construction elements of the detector module 1 mentioned above are arranged hermetically sealed inside a gas-tight housing 6, wherein the housing 6 essentially consists of a bottom plate 7 and a dome-shaped housing element 8 that is placed onto the bottom plate 7.

On its upper surface, the dome-shaped housing element 8 has a housing opening 9, wherein the housing opening 9 is closed gas-tightly by a radiation entry window according to the invention 10, wherein the radiation entry window 10 is permeable for the X-ray radiation to be detected, whereas the radiation entry window 10 is not permeable for optical radiation, particularly in a wavelength range visible for humans.

The radiation entry window according to the invention 10 essentially consists of a flat, even and thin window element 11 which is framed on the sides by a much thicker window frame 12 made of a semiconductor material (e.g. silicon). The thin window element 11 consists of planar layers which, using the per se known planar technology, may be grown or applied to the semiconductor material of the window frame 12. Those planar layers may also serve as an etching stop if the semiconductor substrate is partly etched away during the formation of the window frame 12. In this exemplary embodiment, dielectrical planar layers are used, as they are common in planar technology (e.g. silicon dioxide, silicon nitride or polymers). It should be mentioned here that the planar layers forming the thin window element 11 may be applied before etching.

For the mechanical accommodation of the radiation entry window 10, the dome-shaped housing element has a surrounding edge 13 around the housing opening 9, wherein the radiation entry window 10 lies on the outside of the edge 13 of the housing opening 9 and is connected with a glued joint 14 to the dome-shaped housing element 8. This offers the advantage that the radiation entry window 10 is pressed against the edge 13 of the housing opening 9 from the outside in case of an external overpressure due to the pressure conditions.

Figure 2A:
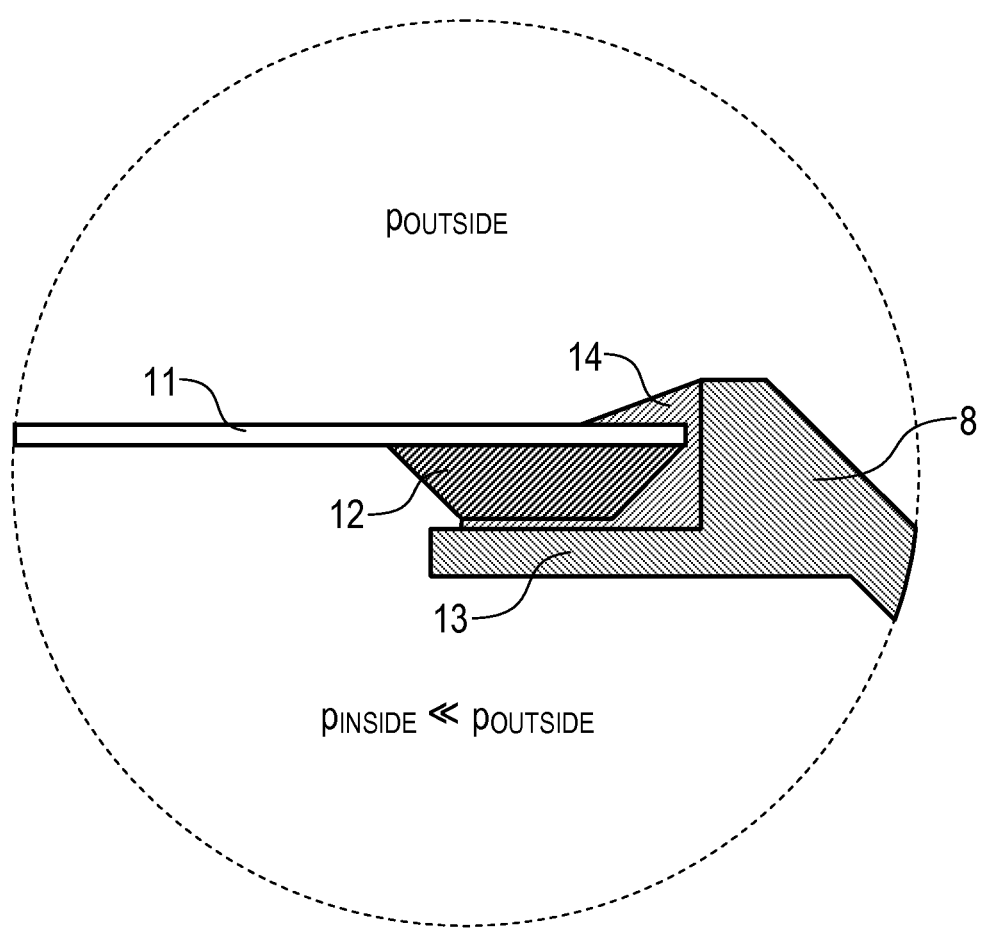
FIG. 2A a detailed view of the window frame from FIG. 1 in cross-section.
Figure 2B:
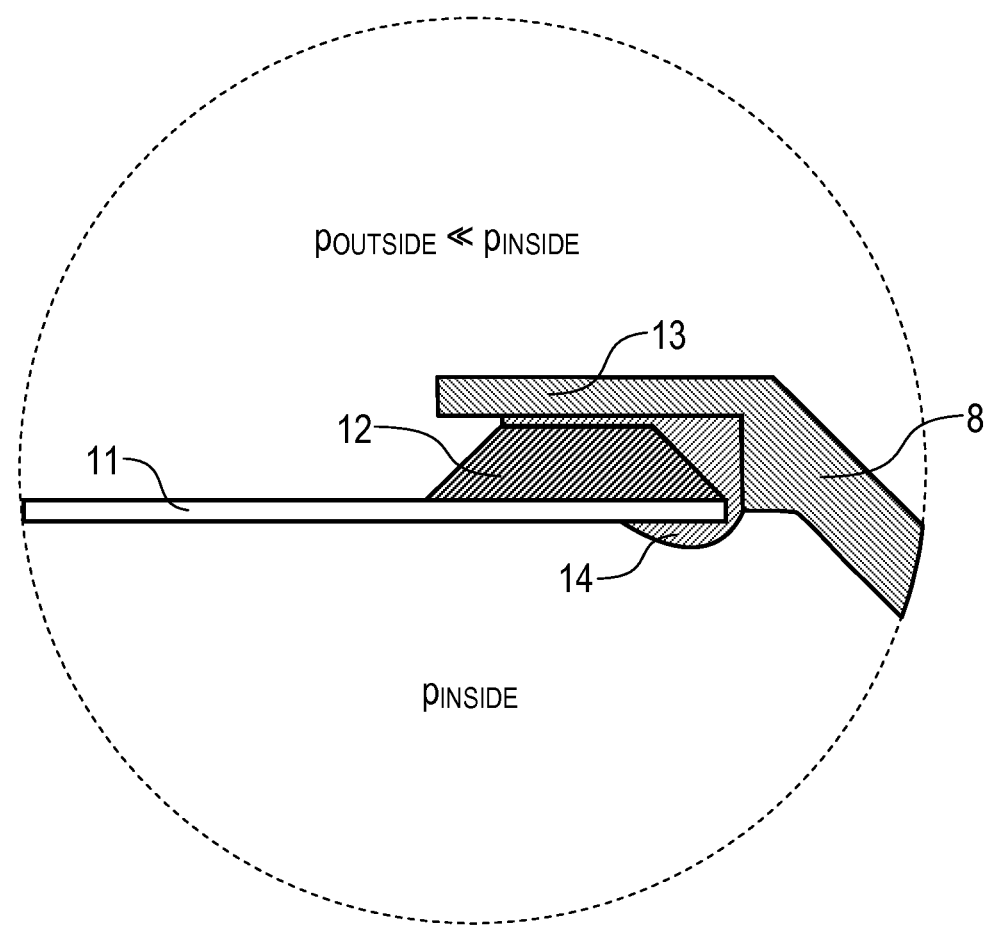
FIG. 2B a modification of FIG. 2A.

FIG. 2B shows a modification of the detailed view of FIG. 2A, so that reference is made to the above description to avoid repetition, wherein the same reference numerals are used for corresponding details.

The particularity of this modification is essentially that the radiation entry window 10 lies on the inside of the edge 13 of the housing opening 9. This is advantageous in case of an internal overpressure in the housing 6, since the radiation entry window 10 is then pressed against the edge of the housing opening 9 from the inside due to the pressure conditions.

Figure 3:
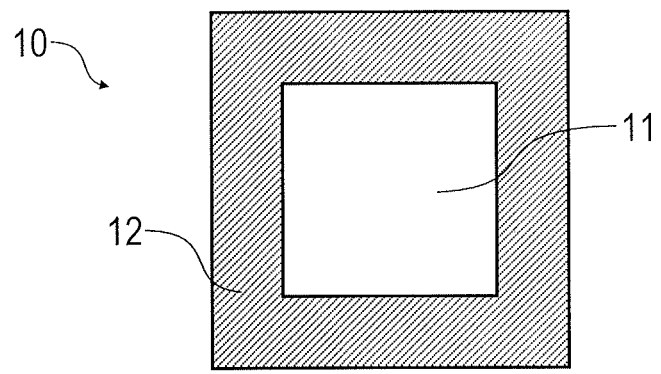
FIG. 3 a plan view of a radiation entry window according to the invention with a relatively small window opening, FIG. 4A a plan view of a radiation entry window according to the invention with a larger window opening and a supporting web, FIG. 4B a cross-sectional view of the radiation entry window according to FIG. 4A, FIG. 5A a plan view of a radiation entry window according to the invention with an even larger window opening and two supporting webs arranged cross-wise, as well as FIG. 5B a cross-section through the radiation entry window according to FIG. 5A.

FIG. 3 shows a view of a radiation entry window 10 according to the invention, which corresponds in part to the exemplary embodiment described above, so that reference is made to the above description to avoid repetition, wherein the same reference numerals are used for corresponding details.

It should be mentioned for this exemplary embodiment that the window frame 12 and the thin window element 11 are rectangular.

It should also be mentioned with regard to this exemplary embodiment that the radiation entry window 10 has a relatively small window opening, so that the thin window element 11 does not have to be mechanically supported across its free plane.

Figure 4A:
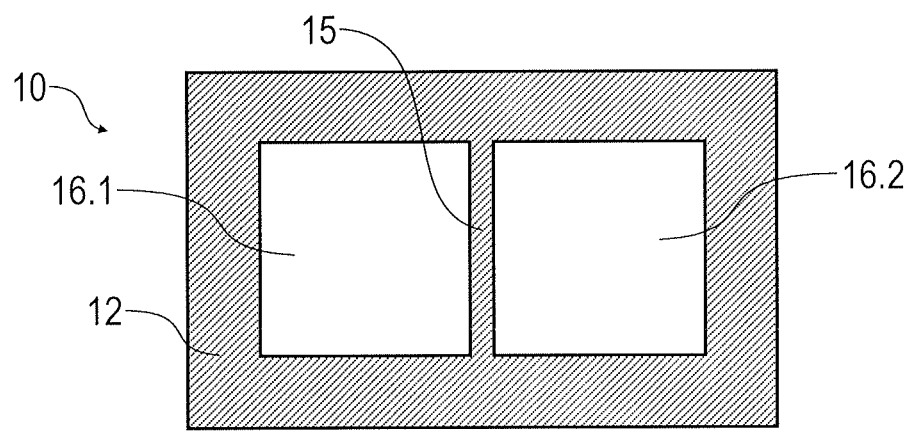
Figure 4B:
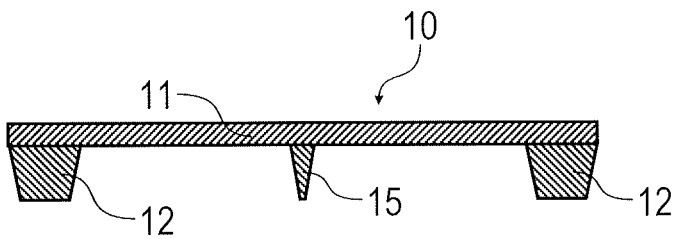

FIGS. 4A and 4B show a modification of the radiation entry window according to FIG. 3, so that reference is made to the above description to avoid repetition, wherein the same reference numerals are used for corresponding details.

One particularity of this exemplary embodiment is that the radiation entry window 10 has a considerably larger window opening, which necessitates a mechanical support from a centrally arranged supporting web 15, wherein the supporting web 15 is made of the same material as the window frame 12 and subdivides the thin window element 11 into two window openings 16.1, 16.2.

The cross-sectional view in FIG. 4B further shows that both the window frame 12 and the supporting web 15 have a trapezoidal cross-section, wherein the cross-section widens towards the thin window element 11 as is necessitated by the manufacturing according to the planar technology.

Figure 5A:
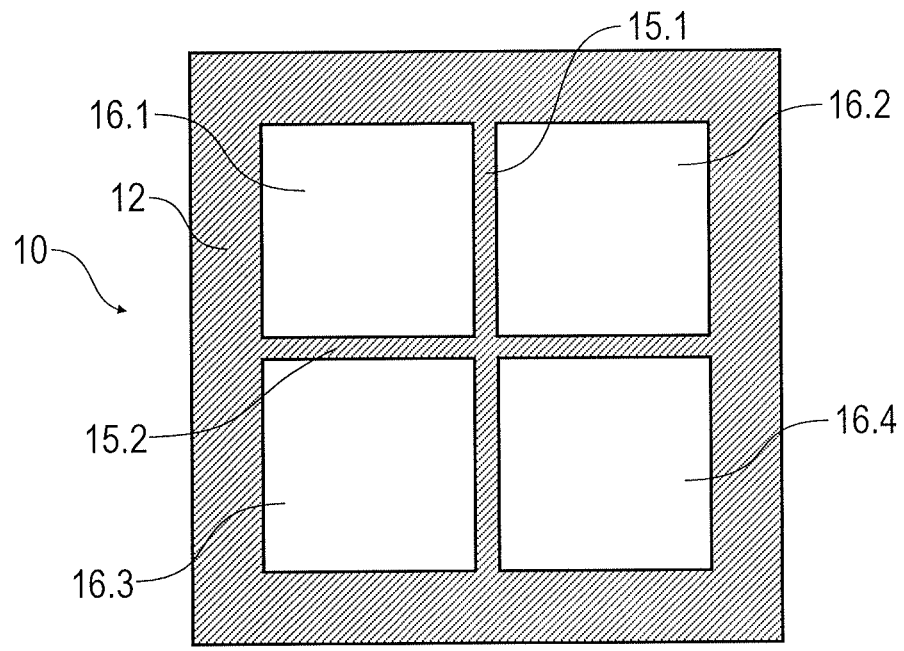
Figure 5B:
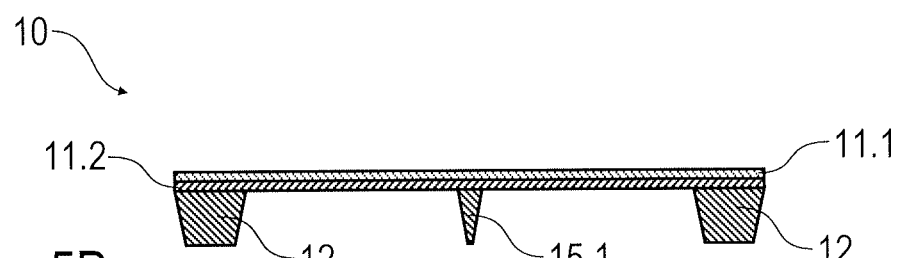

FIGS. 5A and 5B show a modification of the exemplary embodiment according to FIGS. 4A and 4B, so that reference is made to the above description to avoid repetition, wherein the same reference numerals are used for corresponding details.

One particularity of this exemplary embodiment is the considerably larger window area, which necessitates a mechanical support from two supporting webs 15.1, 15.2 arranged cross-wise, wherein the supporting webs 15.1, 15.2 subdivide a total of four neighboring window openings 16.1-16.4.

In addition, it can be seen in this representation that the thin window element 11 consists of two planar levels 11.1, 11.2 placed one over the other which consist of different materials.

FIG. 6 shows one of the possible manufacturing processes in the context of planar technology on the example of a silicon wafer. Here, the same reference numerals as in the description above are used for corresponding details, so that to avoid repetition reference is made to the above description.

In a first step (FIG. 6A), a wafer 17 is thermally oxidized, so that the wafer 17 is coated on both sides with an oxide layer 18, 19.

In a second step (FIG. 6B), the oxide layer 19 is structured on the side that is the future frame side (lower side in the drawing), so that only the future window frame 12 and the supporting webs 15.1 are covered.

Figure 6A:
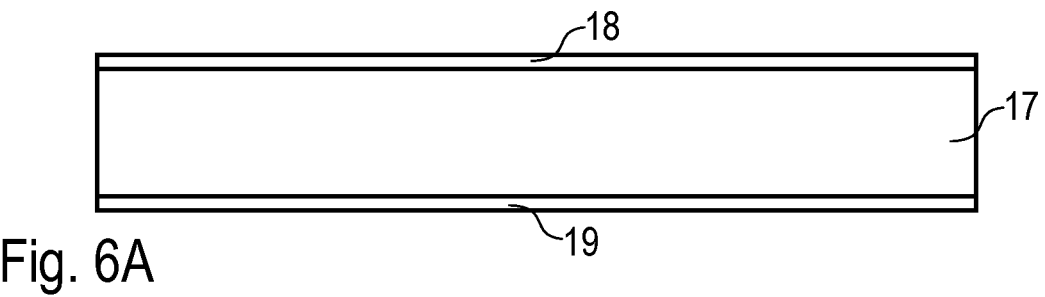
FIGS. 6A-6D a possible process sequence in the context of planar technology for manufacturing the radiation entry window according to the invention.
Figure 6B:
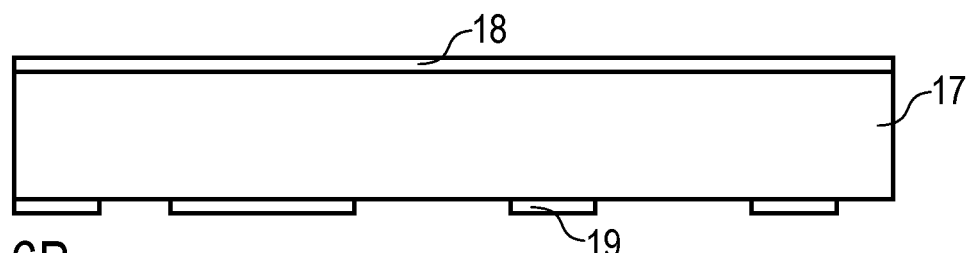
Figure 6C:
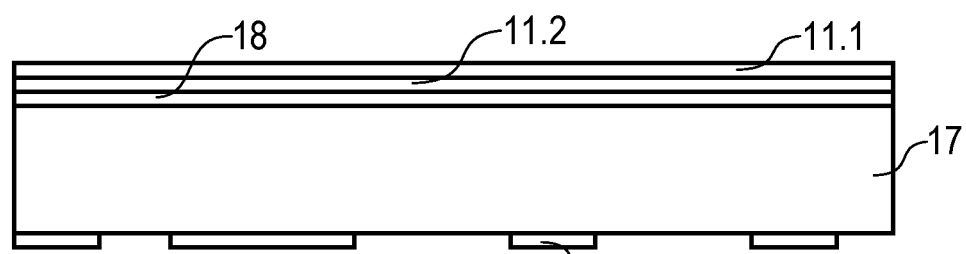

Then, only on the future window side (top side in the drawing) or on both sides, additional layer(s) 11.1, 11.2 are applied (FIG. 6C).

Figure 6D:
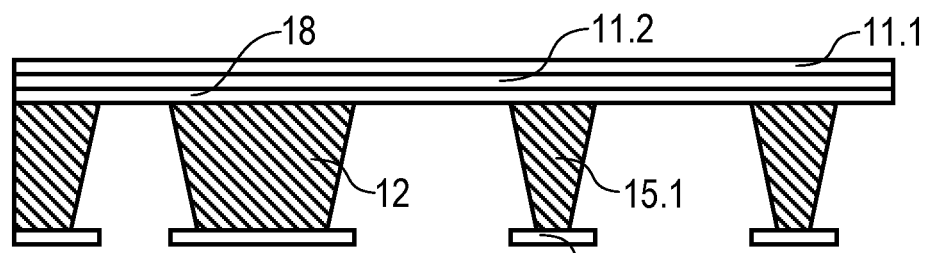

After removing the additional layers on the frame side, the wafer 17 can be etched in a wet chemical process, wherein the structured oxide layer 19 serves as an etching mask. Here, the oxide layer 18 on the window side serves as an etching stop, so that only the oxide as well as the thin layers 11.1, 11.2 applied over it remain in the window area (FIG. 6D). It remains to be mentioned that both isotropic and anisotropic etching procedures can be used.

During the manufacturing process, there is also a separation of the individual radiation entry windows 10 from a panel that comprises several radiation entry windows during manufacture. This separation also occurs during etching in the same etching step. Here, the geometry is defined by a suitable mask before etching.

The invention is not limited to the preferred exemplary embodiments described above. Instead, a plurality of variants and modifications are possible, which also make use of the concept of the invention and thus fall within the scope of protection. This also includes modifications in the geometry of the windows and the supporting structure. It may be advantageous in some cases to use non-rectangular, round or hexagonal structure.

LIST OF REFERENCE NUMERALS

1 Detector module
2 Semiconductor drift detector
3 Ceramic substrate
4 Peltier element
5 Collimator
6 Housing
7 Bottom plate
8 Dome-shaped housing element
9 Housing opening
10 Radiation entry window
11 Window element
11.1, 11.2 Planar layers
13 Edge of the housing opening
14 Adhesive joint
15, 15.1, 15.2 Supporting web
16.1-16.4 Window opening
17 Wafer
18 Oxide layer
19 Oxide layer

The invention claimed is:

1. A radiation entry window for a radiation detector, comprising:
   (a) a flat window element, which is at least partially permeable for radiation to be detected by the radiation detector; and
   (b) a window frame, which laterally frames the window element, wherein:
      (i) the window frame consists of a semiconductor material and is thicker than the window element;
      (ii) the window frame is manufactured in planar technology in a semiconductor process;
      (iii) the window frame is connected quasi monolithically with the window element; and
      (iv) the window frame has a substantially isosceles trapezoidal cross-section which widens toward the window element; and
   wherein the radiation entry window is separated from a panel comprising several radiation entry windows.

2. The radiation entry window according to claim 1, wherein the flat window element has a first side configured for exposure to radiation and a second side opposite said first side and wherein said window frame is arranged on said second side of the flat window element.

3. The radiation entry window according to claim 2, wherein the window frame has a cross-section profile, which widens outwardly from said second side facing away from the radiation.

4. The radiation entry window according to claim 1, wherein the flat window element has a first side configured for exposure to radiation and wherein said window frame is arranged on said first side of the flat window element.

5. The radiation entry window according to claim 4, wherein the window frame has a cross-section profile, which widens inwardly from said first side facing the radiation.

6. The radiation entry window according to claim 1, wherein the flat window element consists of a single planar layer.

7. The radiation entry window according to claim 6, wherein the planar layer is at least partially comprised of a member selected from the group consisting of silicon dioxide, silicon nitride, bis-benzocyclobutene, ormocer, polyimides, organic material, inorganic material, and semiconductor material.

8. The radiation entry window according to claim 1, wherein the flat window element has a plurality of different planar layers, which lie one above the other.

9. The radiation entry window according to claim 1, wherein the flat window element comprises at least one planar layer, which is epitaxially grown on or applied onto the semiconductor material of the window frame, and wherein the at least one planar layer is dielectric.

10. The radiation entry window according to claim 1, wherein
   the flat window element is mechanically supported by at least one supporting web, which divides the flat window element into a plurality of window openings,
   the supporting web is connected monolithically with the window frame, and
   the supporting web consists of the semiconductor material of the window frame.

11. The radiation entry window according to claim 10, wherein the supporting web lies on one side on the flat window element and has a cross-section, which widens in a direction of the flat window element.

12. The radiation entry window according to claim 11, wherein flat window element has a first side configured for exposure to radiation and a second side opposite said first side and wherein said supporting web is arranged on said first side of the flat window element facing away from the radiation.

13. The radiation entry window according to claim 11, wherein the flat window element has a first side configured for exposure to radiation and wherein said supporting web is on said second side of the flat window element.

14. The radiation entry window according to claim 10, wherein the supporting web has a cross-section, which is essentially rectangular.

15. The radiation entry window according to claim 1, wherein the semiconductor material of the window frame is silicon, and the radiation entry window is essentially gas-tight.

16. The radiation entry window according to claim 1, wherein the radiation entry window is not permeable for optical radiation in a wavelength range, which is visible for humans, and the radiation entry window is essentially permeable for X-ray radiation.

17. A detector module comprising:
a radiation detector for the detection of radiation; and
a housing with a radiation entry window according to claim 1, wherein the radiation detector is arranged in the housing and radiation to be detected passes from the outside through the radiation entry window onto the radiation detector.

18. The detector module according to claim 17, wherein the radiation entry window is connected by an adhesive joint with the housing of the detector module, wherein the adhesive joint detects the window frame and the flat window element.

19. The detector module according to claim 17, wherein the housing has one housing opening with a circumferential edge.

20. The detector module according to claim 19, wherein the radiation entry window lies with the window frame outside on an edge of the housing opening so that the radiation entry window is pressed at an external overpressure onto the housing opening.

21. The detector module according to claim 19, wherein the radiation entry window lies with the window frame inside on an edge of the housing opening so that the radiation entry window is pressed at an internal overpressure onto the housing opening.

22. A spectrometer with at least one detector module according to claim 17.

23. The spectrometer according to claim 22, wherein the spectrometer is an X-ray spectrometer.

24. A manufacturing method for a radiation entry window according to claim 1, for a radiation detector, comprising the following steps:
a) providing a flat window element comprising a semiconductor material,
b) coating the window element with an external oxide layer on an external side of the window element facing radiation,
c) coating the window element with an inner oxide layer on an inner side of the window element facing away from the radiation,
d) structuring at least one of the external oxide layer and the inner oxide layer so that only one future window frame comprising the semiconductor material and/or only one future supporting web comprising the semiconductor material remains covered,
e) removing by wet chemical etching an area of the window element, which is not covered after structuring so that the future window frame and/or the future supporting web stands still, and
f) separating the radiation entry window from a panel comprising several radiation entry windows by etching,
wherein said etching in steps e and f results in the window frame having a substantially isosceles trapezoidal cross section.

25. The manufacturing method according to claim 24, wherein:
i) the inner or external oxide layer forms an etching mask on a frame side; and
ii) the inner or external oxide layer forms an etching stop on a side facing away from the frame.

* * * * *